UNITED STATES PATENT OFFICE.

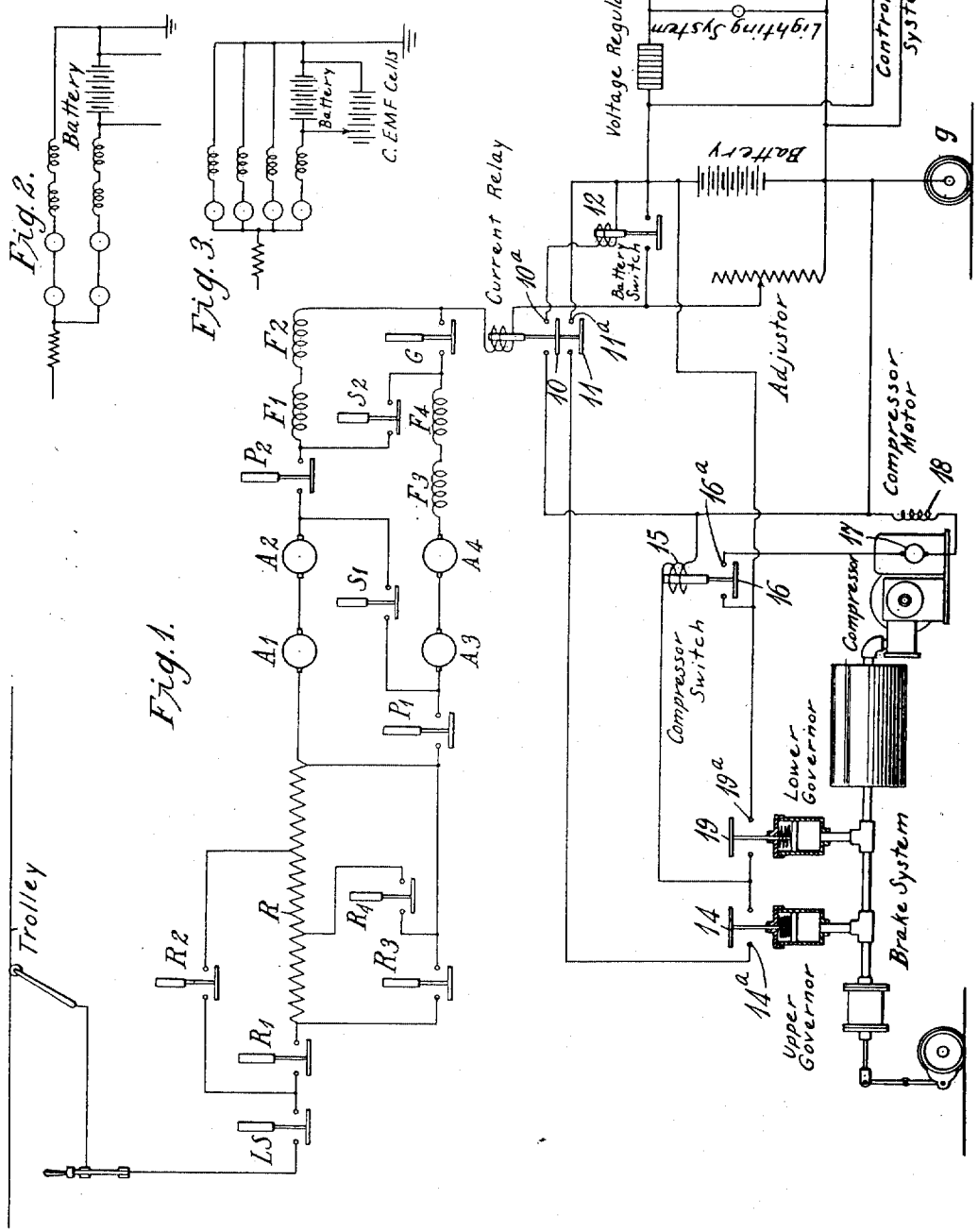

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,231,662. Specification of Letters Patent. Patented July 3, 1917.

Application filed July 29, 1913. Serial No. 781,742.

*To all whom it may concern:*

Be it known that I, NORMAN W. STORER, a citizen of the United States, and a resident of Pittsburgh, in the county of Allegheny and State of Pennsylvania, have invented a new and useful Improvement in Control Systems, of which the following is a specification.

My invention relates to control systems for electric motors, and it has special reference to relatively high-voltage direct-current control systems for railway motors.

One of the objects of my invention is to simplify and improve the arrangement of circuits and the operation of control systems of the above indicated class, and to provide a high-voltage control system in which the main motor current may be utilized for operating the auxiliary apparatus, such as motor-driven compressors, lighting and control systems.

A further object of my invention is to provide a storage battery or other energy-accumulator which shall, under normal operating conditions, be connected in circuit with the driving motors and shall be charged by the motor current, except at such times as the motor current is utilized for operating the auxiliary apparatus.

A further object of my invention is to provide simple and adequate means, such as a resistor or counter electromotive force cells, which may be adjusted to suit the particular conditions of service for governing or adjusting the battery-charging current for any given interval of time to an amount which is just sufficient to maintain the battery in a charged condition.

A still further object of my invention is to provide means that shall be dependent upon predetermined pressure conditions of a pneumatic or other fluid-operated braking system, for utilizing all, or part, of the main motor current delivered from the main source of energy to operate the motor-compressor, when the driving motors are in operation; and to operate the motor compressor from the storage battery under conditions when the driving motors are not in operation and the pressure has fallen to a predetermined minimum value.

When the usual 600 volt direct current railway system is employed, the auxiliary apparatus is customarily operated directly from the trolley conductor.

In recent years, the development of 1200 and 1500 volt systems has been accomplished, and, in such cases, the auxiliary apparatus, such as the lighting and control circuits and the motor-compressors, have received their energy from a so-called "dynamotor" which serves to deliver a low voltage for these purposes, or from motors operated directly from the high trolley voltage. Motor-generator sets have also been proposed for supplying energy to the auxiliary apparatus.

However, the use of high voltage dynamotors and motor generator sets is undesirable under certain operating conditions, and results in difficulties in some classes of service and with certain types of equipments.

It is with the intention of improving operation that I have devised my present system, and also, for the purpose of meeting the demands of systems of even higher voltage, such as 2400, 3600 or 4800 volts, which are being contemplated in future railway development, particularly for high speed interurban service and steam railroad electrifications.

According to my invention, I propose to employ a storage battery which shall normally be connected either in series relation with all of the driving motors and be traversed by the entire motor current, or shall be connected in series circuit with a portion of the motors, in which case it will be affected only by a proportionate part of the total motor current. The specific location of the storage battery, with respect to the main motor circuits, will depend largely upon the voltage of the system and the characteristics of the service.

If a trolley voltage of 3600 volts be employed, the main motor current will be comparatively small, and, if a storage battery taking normally 100 volts is used, which is less than 3% of the line voltage, the current will be approximately the proper amount for driving the motor-compressor and furnishing energy for the lighting and control circuits and other auxiliary apparatus.

For example, the full-load current for the driving motors of a 50 ton car for 3600 volt service will be about 100 amperes. A 100 volt compressor motor for such an enquipment will take from 50 to 60 amperes and the average running current for the car will be approximately 60 amperes. It will, therefore, be seen that the average motor current is of substantially the proper value for operating the auxiliary apparatus and that the battery itself will only have to take care of the difference between the main motor current and the current required by the auxiliaries.

The capacity of the battery should be sufficient to operate all of the auxiliaries for one or two hours, if necessary, but, in ordinary service, the battery would furnish only a small part of the current used by the auxiliaries, and would intermittently be charged and discharged by small amounts, the main motor current being utilized, almost exclusively, for the auxiliary apparatus.

Moreover, instead of operating the compressor to pump up the braking system when the driving motors are at a standstill, as is customarily done, the motor-compressor is arranged to be operated, as far as possible, when the driving motors are running, and to be operated when the car is at rest only when the pressure has fallen to a predetermined minimum value. In such an event, of course, the battery would supply the necessary energy for operation.

My invention may best be understood by reference to the accompanying drawing, in which Figure 1 is a diagrammatic view of the main circuit of a system of control embodying my invention, and Figs. 2 and 3 are schematic diagrams of modified forms of my invention.

Referring to Fig. 1 of the drawings, the apparatus shown comprises a supply circuit marked "Trolley," receiving energy from a suitable source (not shown); a plurality of driving motors having, respectively, armatures A1, A2, A3 and A4 and field magnet windings F1, F2, F3 and F4; an accelerating resistor R; switches R1, R2, R3 and R4 for adjusting the circuit connections of the resistor R; a plurality of motor circuit switches LS, S1, S2, P1, P2, and G for arranging the motor circuits for series and parallel operation; an accumulator or storage battery marked "Battery" connected in series circuit with the aforesaid driving motors under normal operating conditions; translating devices marked, "Lighting System" connected in multiple to said "Battery"; a switching device marked "Voltage Regulator" for controlling the voltage of said "Lighting System," a "Compressor" adapted to create a predetermined fluid pressure in a system of a common type marked "Brake System"; a "Compressor Motor" for driving said "Compressor"; a switching device marked "Compressor Switch" in circuit with the "Compressor Motor"; an "Adjuster" in multiple circuit with said "Battery" for controlling the battery charging current; a switch marked "Battery Switch" in series circuit with said "Battery" and in multiple with said "Adjuster"; an electro-responsive switching device marked "Current Relay" dependent for its operation upon the flow of motor current; a plurality of pressure governors respectively marked "Upper Governor" and "Lower Governor" for controlling the operation of the "Compressor Switch" in accordance with predetermined pressure conditions of the "Brake System"; and a return circuit $g$.

For purposes of illustration, I have shown my invention in connection with a specific arrangement of motors and motor circuits and switches. However, inasmuch as my invention pertains only indirectly to this portion of the system, and, so far as its operation is concerned, is independent of it, except as it utilizes the motor current which traverses the driving motors, no detailed description of its operation will be given.

A full exposition of this portion of the system may be found in my co-pending application, Serial No. 793,107 filed October 3, 1913, and assigned to the Westinghouse Electric & Mfg. Co., but it should be understood that my present invention is not in any way restricted to this particular type of control and is applicable to many other well known control systems.

The "Battery" and "Current Relay" are connected in series circuit with the driving motors and may be traversed by substantially the total motor current, although, if desired, by reason of the service conditions and line voltage, the "Battery" may be connected in circuit with one of the pairs of driving motors and thus be traversed by substantially half the motor current during parallel operation, as shown in Fig. 2, or in circuit with one of the motors, as shown in Fig. 3.

Assuming that the driving motors are in operation and that the pressure of the "Brake System" is at its normal value, the operation of the system is as follows:

The "Current Relay" is energized by the motor current, which initially passes through the "Adjuster," and its switch members 10 and 11 are raised into contact with their coöperating contact terminals 10$^a$ and 11$^a$. By reason of the engagement of contact members 10 and 10$^a$, energy is supplied to the energizing coil 12 of the "Battery Switch" from the positive side of the "Battery" to the return circuit conductor $g$. The "Battery Switch" is thus closed, thereby connecting the "Battery" in multiple circuit with the "Adjuster," after which the main motor current supplies the "Battery," "Adjuster" and auxiliaries.

In order to maintain a constant voltage on the "Lighting System," a "Voltage Regulator" of suitable form is employed, in accordance with usual practice, and no description thereof is deemed necessary.

If, while these conditions obtain, the pressure of the "Brake System" falls to a value for which the "Upper Governor" is adjusted, its switch member 14 is permitted to drop and complete a circuit from the positive side of the "Battery" through coöperating contact members 11 and 11ᵃ of the "Current Relay," coöperating contact members 14 and 14ᵃ of the "Upper Governor," and energizing coil 15 of the "Compressor Switch" to the return circuit g. Thus, the coil 15 is energized, and the "Compressor Switch" closed. In so doing, a circuit is completed from the positive side of the "Battery" through switch members 16 and 16ᵃ of the "Compressor Switch," and armature 17 and field magnet winding 18 of the "Compressor Motor" to the return circuit g. The main motor current, which serves to charge the "Battery" prior to the closure of the "Compressor Switch," is thus shunted through the circuit just traced and is utilized, at least in part, to operate the "Compressor Motor" for the purpose of driving the "Compressor" and pumping up the "Brake System" to its normal value.

During this operation, the "Battery" may continue to be charged by a small amount of current or may be called upon to supply a portion of the energy for the "Compressor Motor," dependent, of course, upon the amount of current taken by the driving motors at this particular time.

As soon as the predetermined normal pressure is restored in the "Brake System," contact members 14 and 14ᵃ of the "Upper Governor" are disengaged and the "Compressor Switch" is opened to disconnect the "Compressor Motor."

The circuit through the energizing coil 15 of the "Compressor Switch" is interlocked through the contact members 14 and 14ᵃ of the "Upper Governor" and also through contact members 11 and 11ᵃ of the "Current Relay." It is, therefore, evident that, under normal operating conditions, the "Compressor Motor" can be operated only when the driving motors are taking current and thereby holding the "Current Relay" switches in engagement.

If the driving motors are at rest, the "Battery Switch" cannot be closed, and, if the pressure of the "Brake System" falls to a minimum safe value for which the "Lower Governor" is set, its contact members 19 and 19ᵃ complete a circuit through the energizing coil 15, and the "Compressor Switch" is closed to deliver energy from the "Battery" for operating the "Compressor Motor" and "Compressor." In fact, the "Lower Governor" will act to close the "Compressor Switch" irrespective of the condition of the driving motors.

In the manner hereinbefore explained, the "Battery" is normally charged during operation by the greater portion of the motor current, except at such time as the motor current is utilized for driving the motor-compressor set. The "Battery" is employed for operating the "Compressor Motor" and other auxiliaries when the vehicle is at rest, and also for supplying a certain amount of current under conditions when the motor current is insufficient for the purpose.

The "Battery," therefore, is subjected to periods of charge and discharge, and the "Adjuster" is set for the particular service in which the equipment is operated in order that the total charging current for a given period shall be sufficient to maintain the "Battery" at substantially full-charge conditions without subjecting it to excessive charging currents or excessive over-charge.

The "Adjuster" may conveniently be an adjustable resistor as shown in Fig. 1, or a plurality of counter electromotive force cells marked "C. E. M. F." as shown in Fig. 3, but is not restricted to any particular class of apparatus, as any suitable devices may be employed.

Many modifications in the circuit connections and arrangement of apparatus and in the operation thereof may be effected within the spirit and scope of my invention, and I desire that only such limitations shall be imposed as are indicated in the appended claims.

I claim as my invention:

1. In a control system, the combination with a source of energy, main translating devices and auxiliary translating devices, of an energy-accumulating device, and means dependent upon predetermined conditions for selectively energizing said auxiliary devices from said source and said accumulating device.

2. In a control system, the combination with a source of energy, main translating means receiving energy from said source, and auxiliary translating means, of electrical means in circuit with said main translating means under predetermined circuit conditions, and means for connecting said auxiliary translating means in multiple with said electrical means.

3. In a control system, the combination with a source of energy, main translating means receiving energy from said source, and auxiliary translating means, of energy-accumulating means normally traversed by the current of said main translating means, and automatic means for shunting the main current through said auxiliary translating means under predetermined conditions.

4. In a control system, the combination with a source of energy, main translating means receiving energy from said source, and auxiliary translating means, of energy-accumulating means, automatic means for connecting said accumulating means in circuit with said main translating means, and means for causing the current of the main translating means to traverse the circuits of the auxiliary translating means under predetermined conditions.

5. In a control system, the combination with a source of energy, main translating means receiving energy from said source, and auxiliary translating means, of an energy accumulator normally connected in series circuit with said main translating means and adapted to be charged, means for connecting said auxiliary translating means in shunt to said accumulator under predetermined conditions, and electro-responsive means for causing said accumulator to discharge through said auxiliary translating means under other predetermined conditions.

6. In a control system, the combination with a source of energy, main translating means receiving energy from said source, and auxiliary translating means, of an energy accumulator normally in circuit with said main translating means, automatic means for inserting said auxiliary translating means in parallel-circuit relation with the accumulator, and means for determining the amount of current traversing said accumulator.

7. In a control system, the combination with a source of energy, main translating means receiving energy from said source, and auxiliary translating means, of an energy accumulator normally in circuit with said main translating means, variable means in shunt thereto for diverting a portion of main current from said accumulator and automatic means for inserting said auxiliary translating means in circuit with the accumulator.

8. In a control system, the combination with a source of energy, an electric motor supplied therefrom, a storage battery, and an auxiliary translating device, of pneumatic means dependent upon predetermined conditions for causing the motor current to traverse said storage battery or said auxiliary translating device.

9. In a control system, the combination with a source of energy, an electric motor supplied therefrom, a storage battery, and an auxiliary translating device, of electro-responsive means for connecting said battery in series circuit with said motor, and means dependent upon predetermined conditions for connecting said auxiliary translating device in multiple circuit with said battery.

10. In a control system, the combination with a source of energy, an electric motor supplied therefrom, a storage battery, and an auxiliary dynamo-electric machine, of means for causing the motor current to charge said battery under normal operating conditions, and means automatically operated under predetermined conditions for diverting said motor current through said auxiliary machine.

11. In a control system, the combination with a source of energy, an electric motor supplied therefrom, a storage battery, and an auxiliary translating device, of means dependent upon the motor current for connecting said battery in series circuit with said motor, whereby said battery is charged, and means independent of said motor current for causing said auxiliary translating device to be supplied from said source of energy or from said battery.

12. In a control system, the combination with a source of energy, and an electric motor connected thereto, of a storage battery, an auxiliary translating device, means for connecting said storage battery or said translating device in series circuit with said motor and variable means for determining the amount of current passing through said storage battery.

13. In a control system, the combination with a source of energy, and an electric motor connected thereto, of a storage battery and an auxiliary translating device, of a plural means for connecting said battery in series with said motor and for connecting said translating device in multiple circuit with said battery, said means being dependent upon separate and independent conditions.

14. In a control system, the combination with a source of energy, main translating devices and auxiliary translating devices, of an energy-accumulating device, and means dependent upon operation of the main translating devices for energizing the auxiliary devices from the source and the accumulating device.

15. In a control system, the combination with a source of energy, and an electric motor connected thereto, of a storage battery, an auxiliary translating device, means for connecting said battery in series circuit with said motor only when said motor is operating, means for shunting the motor current through said translating device under predetermined conditions, and means for limiting the current traversing said battery.

16. In a control system, the combination with a source of energy, a vehicle-propelling electric motor, a storage battery and auxiliary translating devices, of means dependent upon operation of the motor for supplying energy to the battery and the auxiliary translating devices, and for causing the battery to supply energy to the auxiliary translating devices when the motor is not operating.

17. In a control system, the combination with a source of energy, an electric motor, a storage battery and an auxiliary translating device, of an adjustable resistance in circuit with said motor, an electro-responsive device for connecting said battery in multiple with said resistance, and means for connecting said translating device in multiple with said battery under predetermined conditions.

18. In a control system, the combination with a source of energy, an electric motor, a storage battery and an auxiliary translating device, of a resistance in series relation with said motor, an electro-responsive device dependent upon the motor current for connecting said battery in multiple with said resistance, and automatic means, responsive to conditions independent of the motor circuit, for connecting said translating device in multiple with said battery.

19. In a control system, the combination with a source of energy, an electric motor supplied therefrom, and an auxiliary fluid pressure system, of a storage battery normally connected in circuit with said motor, a translating device, and means dependent upon conditions of said pressure system for connecting said translating device in multiple with said battery.

20. In a control system, the combination with a source of energy, an electric motor supplied therefrom, a translating device, a battery and an auxiliary fluid-pressure system, of means for connecting said translating device in shunt to said battery under predetermined conditions of pressure of said system and means for disconnecting said battery when said motor is not operating.

21. In a control system, the combination with a source of energy, an electric motor supplied therefrom, a translating device, a battery and an auxiliary fluid-pressure system, of means for connecting said auxiliary translating device in shunt to said battery in accordance with predetermined conditions of pressure of said system, and selective means for causing said source of energy or said battery to supply said translating device.

22. In a control system, the combination with a source of energy, an electric motor supplied therefrom, and an auxiliary fluid-pressure system, of a storage battery adapted to be connected in series with said motor when said motor is running, an auxiliary translating device, means dependent upon a predetermined pressure of said pressure system for connecting said device in multiple with said battery when said motor is running, and means dependent upon other predetermined pressure conditions for establishing said connection independent of the operation of said motor.

23. In a control system, the combination with a source of energy, a motor supplied thereby, a storage battery, a fluid-pressure system, and a motor-driven compressor associated therewith, of means for connecting the battery in series with said motor when said motor is running and for disconnecting said battery when said motor is not in operation, means dependent upon a predetermined condition of said pressure system for connecting the compressor motor in shunt to said battery during conditions of motor operation, and means dependent upon a lower-pressure condition for making said connection, irrespective of the conditions of motor operation.

24. In a control system, the combination with a source of energy, a motor supplied thereby, a storage battery, a fluid-pressure system, and a motor-driven compressor associated therewith, of means for connecting the battery in series with said motor when said motor is running and for disconnecting said battery when said motor is not in operation, an electrically operated switch for connecting said compressor motor in shunt to said battery, and governing means dependent upon the pressure of said system for energizing said switch under predetermined conditions when said motor is running and for energizing said switch under other predetermined conditions irrespective of the operating conditions of said motor.

25. In a control system, the combination with a source of energy, a motor supplied thereby, a storage battery, a fluid pressure system and a motor driven compressor associated therewith, of means for connecting the battery in series with said motor when said motor is running and for disconnecting said battery when said motor is not in operation, an electrically operated switch for connecting said compressor motor in shunt to said battery, and separate governing devices, dependent upon different predetermined conditions of said system, for energizing said switch only when said motor is in operation, and irrespective of the operating conditions of said motor.

26. In a control system, the combination with a source of energy, an electric motor supplied therefrom, a storage battery normally connected in series circuit therewith during operation, and auxiliary translating means, of a counter electromotive force battery adapted to be connected in multiple circuit with said storage battery for controlling the charging current thereof, and means for connecting said translating means in multiple with said batteries under predetermined conditions.

27. In a control system, the combination with a source of energy, an electric motor receiving energy from said source, and auxiliary translating means, of a storage battery normally in series circuit with the motor, an adjustable counter electromotive force battery in multiple circuit with the storage battery for governing the current traversing the storage battery in accordance with service conditions, and means for connecting said translating means in multiple with said batteries under predetermined conditions.

In testimony whereof, I have hereunto subscribed my name this 23rd day of July, 1913.

NORMAN W. STORER.

Witnesses:
D. C. HERSHBERGER,
B. B. HINES.

Copies of this patent may be obtained for five cents each, by addressing the "Commissioner of Patents, Washington, D. C."